United States Patent [19]
Harris et al.

[11] Patent Number: 5,813,466
[45] Date of Patent: Sep. 29, 1998

[54] DELAYED ACID FOR GEL BREAKING

[75] Inventors: Ralph E. Harris; Richard J. Hodgson, both of Horsham, United Kingdom

[73] Assignee: Cleansorb Limited, United Kingdom

[21] Appl. No.: 750,457

[22] PCT Filed: Jun. 6, 1995

[86] PCT No.: PCT/GB95/01295

§ 371 Date: Feb. 24, 1997

§ 102(e) Date: Feb. 24, 1997

[87] PCT Pub. No.: WO95/33914

PCT Pub. Date: Dec. 14, 1995

[30] Foreign Application Priority Data

Jun. 6, 1994 [GB] United Kingdom ............. 9411269

[51] Int. Cl.⁶ .................. E21B 33/13; E21B 33/138; E21B 43/22; E21B 43/26
[52] U.S. Cl. ................. 166/300; 166/295; 166/308; 252/358; 507/201; 507/211; 507/215; 507/216; 507/903; 507/921; 405/264; 523/130
[58] Field of Search .................... 166/270, 300, 166/294, 295, 307, 308; 252/315.3, 315.4, 342, 358; 507/101, 201, 209, 211, 212, 213, 214, 215, 216, 217, 267, 903, 921; 523/130; 405/264

[56] References Cited

U.S. PATENT DOCUMENTS

| | | |
|---|---|---|
| 3,960,736 | 6/1976 | Free et al. ............ 166/308 X |
| 4,169,798 | 10/1979 | De Martino . |
| 4,216,829 | 8/1980 | Murphey ............ 166/295 X |
| 4,506,734 | 3/1985 | Nolte ................. 166/308 |
| 4,619,776 | 10/1986 | Mondshine ......... 166/308 X |
| 4,659,811 | 4/1987 | Wu ................... 507/903 X |
| 4,665,988 | 5/1987 | Murphey et al. ....... 166/295 |
| 5,082,056 | 1/1992 | Tackett .............. 166/295 |
| 5,201,370 | 4/1993 | Tjon-Joe-Pin ........ 166/300 |
| 5,223,159 | 6/1993 | Smith et al. ........ 166/300 X |
| 5,308,529 | 5/1994 | Kaiserman et al. . |
| 5,363,916 | 11/1994 | Himes et al. ....... 166/300 X |
| 5,439,059 | 8/1995 | Harris et al. ........ 166/300 |
| 5,460,226 | 10/1995 | Lawson et al. ....... 166/300 |

FOREIGN PATENT DOCUMENTS

| | | |
|---|---|---|
| A-101 045 | 8/1983 | European Pat. Off. . |
| 0 505 169 A1 | 9/1992 | European Pat. Off. . |
| WO 94/25731 | 11/1994 | WIPO . |

*Primary Examiner*—George A. Suchfield
*Attorney, Agent, or Firm*—Nixon & Vanderhye

[57] ABSTRACT

A crosslinked water-based gel, for example a gel plug in an underground rock formation or a pipeline, is broken by an enzyme and a substrate which is capable of being converted by the enzyme into an organic acid which breaks down the gel. The enzyme is allowed to catalyze the conversion of the substrate into the acid to cause the breakdown of the gel.

12 Claims, No Drawings

DELAYED ACID FOR GEL BREAKING

BACKGROUND OF THE INVENTION

1. Field of the Invention

The present invention relates to the use of enzymes to generate acid to break crosslinked gels used in industrial applications for viscosifying or solidifying aqueous fluids.

2. Description of the Prior Art

Water-based gels are used for a variety of industrial applications, such as hydraulic fracturing of underground reservoirs and creating temporary plugs in underground rock formations or pipelines. They find application in a wide range of industries such as oil, water, gas, coal, mineral extraction.

Hydraulic fracturing comprises a variety of techniques used to stimulate the production of oil, gas and other fluids from underground formations. In hydraulic fracturing, a suitable fracturing fluid is introduced into an underground formation by way of a wellbore under conditions of flow rate and pressure which are at least sufficient to create and/or extend a fracture into a desired part of the formation. Hydraulic fractures tend to heal unless they are propped open and therefore the fracturing fluid normally carries a proppant (e.g. sand, bauxite, etc) which is forced into the fracture and keeps the broken formation from closing down upon itself once the pressure is released.

Various fluids under pressure have been used in hydraulic fracturing. Most of the fracturing fluids used today are aqueous-based liquids which have been either gelled or foamed. Fracturing fluids need to have a low leak-off rate, a low pumping friction loss and need to carry proppant. The rate of leak-off is dependent on the viscosity and wall-building properties of the fluid.

Aqueous gels are usually prepared by blending a polymeric gelling agent with an aqueous medium. Most frequently, the polymeric gelling agent of choice is a water soluble polysaccharide but may also be a polyacrylamide. The polymeric gelling agent can thus be a solvatable polysaccharide. These polysaccharides form a known class of compounds which include a variety of natural gums and certain cellulosic derivatives which have been rendered hydratable by hydrophilic substituents chemically attached to the polymer backbone. Examples of such polymers include guar, carboxyalkyl guar, hydroxyalkyl guar, carboxyalkyl hydroxyalkyl guar, galactomannan gums, glucomannan gums, xanthan gums and the like.

The water soluble polysaccharides have a remarkable capacity to thicken aqueous liquids. Even small amounts are sufficient to increase the viscosity of such aqueous liquids from 10 to 100 times or more. In many instances, the thickened aqueous liquid has sufficient viscosity to carry the proppant during the course of the fracturing process and represents a satisfactory fracturing fluid. In other instances, it is necessary or desirable to crosslink the polysaccharide in order to form a gel having sufficient strength and viscosity to carry the proppant. A variety of crosslinkers have been developed to achieve this result.

Most water soluble polysaccharides are typically crosslinkable in a basic aqueous medium (at a pH above 7) by a wide variety of organometallic compounds containing titanium or zirconium in a +4 oxidation (valance) state. The borate ion has been used extensively as a crosslinking agent for hydrated guar gums and other galactomannans to form aqueous gels used in fracturing and other areas. For example, a fracturing process which comprises crosslinking guar-containing compositions on-the-fly with borate ions was described by Free in U.S. Pat. No. 3,974,077. The borate crosslinked systems require a basic pH (e.g. 8.5 to 10) for crosslinking to occur.

Other crosslinking agents have been developed using certain transition metals. For example aqueous solutions of galactomannan gums have been crosslinked at pH 6–13 with antimony, bismuth, titanium, zirconium, chromium and iron compounds.

Most water-based drilling fluids have built-in breaker systems that gradually reduce gels to low viscosity solutions at reservoir temperatures and pressures. This allows the fluid to be produced back from the reservoir and prevents blocking of the fracture faces. Breakers may be oxidising agents or enzymes.

Enzymes, such as cellulases and hemicellulases, are used to break down the polymers at a controlled rate. Conventional gel breaking enzymes can only be used for reservoirs or other applications at temperatures below 50° C., since they become inactive at higher temperatures. Chemical breakers, such as sodium persulphate, are used at temperatures above 50° C. Acids, such as hydrochloric acid, at pH values below 5, are known to break crosslinked gels instantaneously once the gels come into contact with the acid.

SUMMARY OF THE INVENTION

It has now been discovered that the use of enzymes to produce organic acids is effective at breaking crosslinked gels which are acid-degradable. The organic acids can thus be produced at a controlled rate which in turn enables the crosslinked gel to be broken at a controlled rate. The gel therefore has a period of time in which it is allowed first to perform its function before it is broken down.

Accordingly, the present invention provides a method of breaking a crosslinked water-based gel, which method comprises:

(i) providing a said gel and, present therewith, an enzyme and a substrate which is capable of being converted by the enzyme into an organic acid which breaks down the gel, and (ii) allowing the enzyme to catalyse the conversion of the substrate into the acid to cause thereby the breakdown of the gel.

Acid can thus be produced in situ in the gel so that the gel degrades over a period of time. The gel, enzyme and substrate are all provided at the same location. The gel can be formed in the presence of the enzyme and substrate. The gel then contains them. Alternatively, the gel can be formed in the presence of the substrate. The gel containing the substrate is then contacted with the enzyme. In both cases, however, acid is produced by the action of the enzyme on the substrate.

The invention may be used to stimulate recovery from reservoirs found in all types of rock formation. It may be used in underground or undersea pipelines. Water and hydrocarbons, for example oil or gas, are generally recovered. The gas may be, for example, methane, ethane or butane. The invention may also be used to create a temporary plug in a pipeline, for example during cleaning and maintenance operations.

DETAILED DESCRIPTION OF THE PREFERRED EMBODIMENTS

The crosslinked water-based gel is a water-based gel of a crosslinked polymer. It is formed from a polymeric gelling agent. Typically it is a crosslinked polysaccharide gel. The polysaccharide is preferably water soluble prior to crosslinking. The polysaccharide from which the crosslinked gel is formed is thus typically a solvatable polysaccharide. The solvatable polysaccharide generally has a molecular weight of 100000 or more, for example from 200000 to 300000. The polysaccharide may be a natural gum, a modified natural gum or a cellulose derivative, for example a hydratable cellulose.

The polysaccharide may therefore be a galactomannan gum such as guar gum or locust bean gum; a modified galactomannan gum such as a carboxyalkyl guar, for example sodium carboxymethyl guar, a hydroxyalkyl guar, for example hydroxyethyl guar or hydroxypropyl guar, or a carboxyalkyl hydroxyalkyl guar, for example sodium carboxymethyl hydroxyethyl guar or sodium carboxymethyl hydroxypropyl guar; a glucomannan gum; a xanthan gum; or a cellulose derivative, for example sodium carboxymethylcellulose, sodium carboxymethyl hydroxyethyl cellulose or hydroxyethyl cellulose.

The gel may alternatively be a crosslinked water-based gel of an acrylamide polymer. It may be a crosslinked polymer of acrylamide itself or of methacrylamide. The polymer may be a homopolymer or a copolymer such as a copolymer with an olefin, acrylic acid and/or methacrylic acid. The olefin may be a $C_2$–$C_4$ olefin such as ethylene or propylene. The olefin is typically only present in a minor proportion. From 5 to 75%, preferably from 35 to 45% such as about 40%, of the carboxamide groups of the acrylamide polymer have generally been hydrolysed to carboxyl groups.

The water-based gel may therefore be formed from any polymer, preferably a water soluble polymer, which can be crosslinked to form a gel. The polymer is typically added to an aqueous liquid such as water in an amount of from 0.3 to 5% by weight, for example 0.4 to 2% by weight or 0.5 to 1% by weight. Crosslinking can be achieved in any appropriate fashion. A crosslinking agent is therefore provided in the aqueous liquid. The amount of crosslinking agent is sufficient to cause the polymer to crosslink.

A crosslinked water-based gel containing an enzyme and an enzyme substrate can be formed in step (i) of the present method by providing in an aqueous liquid:

(a) a polymer capable of being crosslinked to form a gel,
(b) a crosslinking agent,
(c) the enzyme substrate, and
(d) the enzyme.

A crosslinked gel containing the enzyme 30 substrate but not the enzyme can be formed in step (i) by providing (a) to (c) in an aqueous liquid. A pH adjustment agent may also be provided in either case depending, for example, on the pH at which crosslinking occurs. The pH adjustment agent may therefore be a strong base such as an alkali metal or alkaline earth metal hydroxide, for example sodium or potassium hydroxide.

The polymer is crosslinked in the solution to form a water-based gel containing the enzyme substrate and, if desired, enzyme. The rate at which crosslinking is achieved can be controlled, for example by selection of the crosslinking agent and of the conditions applied to the solution. Crosslinking can therefore be achieved in situ at a desired location. The rate at which the crosslinked polymer gel is then broken down is determined by the selection of the enzyme, the enzyme substrate and the conditions affecting the gel.

A borate may be used as a crosslinking agent, again particularly when the polymer is a polysaccharide such as a galactomannan gum such as guar gum or locust bean gum. The borate is typically sodium tetraborate (borax). Other boron compounds that can supply borate ions include boric acid, sodium diborate, potassium tetraborate and sodium pentaborate. The aqueous medium containing the borate and the polymer should be basic so that crosslinking can occur. Borate crosslinking systems suitable for use when fracturing an underground reservoir are described in U.S. Pat. No. 3,058,909 and U.S. Pat. No. 3,974,077.

Other crosslinking agents may be utilised as desired. For example, antimony, bismuth, titanium, zirconium, iron or chromium compounds can be used to crosslink polymers. The antimony and bismuth compounds may be antimony or bismuth compounds sufficiently soluble to provide antimony or bismuth in ionic form, preferably as $Sb^{3+}$, $Bi^{3+}$, $SbO^{1+}$ or $BiO^{1+}$. Such compounds are described in U.S. Pat. No. 3,202,556. Antimony oxide is preferred.

Titanium, zirconium, iron, chromium and other transition metal compounds suitable for use as crosslinking agents are described in U.S. Pat. No. 3,301,723. The titanium compound may be a titanium compound in the +4 oxidation state. It may be an organotitanate such as ammonium tetralactotitanate (IV) or bis(triethanolamine)bis(isopropyl) titanium (IV). Such organotitanates are particularly suitable for crosslinking solvatable polysaccharides, as described in U.S. Pat. No. 3,888,312.

An alternative crosslinking agent is a zirconium compound in the +4 oxidation state. Such a compound is described in U.S. Pat. No. 4,460,751. In particular zirconium oxychloride, zirconium acetate, zirconium tetrachloride, zirconium orthosulphate, zirconium carbonate, zirconium ammonium carbonate and mixtures of two or more thereof may be used. They may be used together with an α-hydroxy acid such as lactic acid and glycolic acid and an amine such as diethanolamine, triethanolamine and dimethylethanolamine.

A retarded crosslinking composition comprising a zirconium (IV) salt or chelate and a polyhydroxyl-containing compound having from 3 to 7 carbon atoms may be employed. The zirconium (IV) salt or chelate may be zirconium (IV) acetylacetonate, zirconium lactate, zirconium carbonate or zirconium diisopropylamine lactate. The polyhydroxyl-containing compound may be glycerol, erythritol, threitol, ribitol, arabinitol, xylitol, allitol, altritol, sorbitol, mannitol, dulcitol, iditol or perseitol as described in U.S. Pat. No. 4,477,360.

Other zirconium crosslinking agents are described in GB-A-2108122, EP-A-0092755 and EP-A-0208373. GB-A-2108122 discloses a class of crosslinking agents prepared by reacting a zirconium tetraalkoxide with an alkanolamine under substantially anhydrous conditions. EP-A-0092755 discloses a method for the preparation of stabilised bisalkyl bis-(trialkanolamine)zirconates. EP-A-0208373 discloses a crosslinking composition for a solvatable polysaccharide comprising an organometallic compound of zirconium or titanium in a +4 valence state and an alkanolamine.

The enzyme used in the method of the present invention is generally a water soluble enzyme. It can either be incorporated into the gel or added to the gel after a period of time. It is advantageous for the enzyme to be readily water soluble. The enzyme may be a hydrolase (EC 3) such as a lipase (EC 3.1.1.3) or an esterase (EC 3.1.1.1).

Lipase may be obtained from wheatgerm, porcine pancreas, Alcaligenes sp, *Aspergillus niger, Humicola lanuginosa, Pseudomonas fluorescens, Rhizopus delemar, Rh. japonicus, Rh. javanicus, Rh. niveus, Penicillium cyclopium, Asperaillus orvzae, Mucor javanicus, Mucor*

*miehei, Candida lipolytica, Candida antarctica, Geotrichum candidum, Humicola acylhydrolase, Penicillium roguefortii, Candida cylindracea, Rhizopus arrhizus, Chromobacterium viscosum*, Pseudomonas species or other sources. The genes coding for an enzyme may be transferred into another organism by genetic manipulation to improve production yields. Genetic engineering may also be used to increase temperature, pressure, salinity and/or metal tolerance of the enzyme.

Esterases may be obtained from porcine liver or rabbit liver or other sources. Most preferably the enzyme is from porcine pancreas, *Rhizopus arrhizus, Mucor javanicus* or Asperaillus sp.

Generally the enzyme will be used in free form in solution but for some applications may be immobilized on a support. The enzyme may be in a controlled release formulation, for example in encapsulated form, to further delay the hydrolysis of the substrate and therefore the generation of acid.

The acid produced according to the method of the present invention is an organic acid, generally an aliphatic carboxylic acid. Preferably the acid is of formula $RCO_2H$ wherein R is hydrogen, a $C_1$ to $C_6$ alkyl or —R'—$CO_2H$ wherein R' is a bond or a $C_1$ to $C_6$ alkylene group. Most preferably the organic acid is acetic acid or formic acid.

The enzyme substrate is generally an ester of the acid with an alcohol of formula $R^2OH$ wherein $R^2$ is $C_1$ to $C_6$ alkyl or —R'—$CO_2H$. Where the acid has a hydroxy substituent, the ester may be a cyclic ester such as alactone.

The alkyl group may be a branched or straight chain group and may have at least one halogen or hydroxyl substituent. A $C_1$ to $C_6$ alkyl group is preferably a $C_1$ to $C_4$ alkyl group, eg. methyl, ethyl, propyl, isopropyl, butyl, n-butyl, sec.butyl or tert.butyl, more preferably it is propyl, methyl or ethyl. A $C_1$–$C_6$ alkyl group substituted by halogen may be a di- or tri-halo-substituted alkyl group in particular a trihalo-$C_1$–$C_6$ alkyl group. A halogen atom is eg. chlorine, bromine or fluorine, preferably it is chlorine or fluorine.

Preferably the substrate is ethyl acetate, 1,2-ethanediol diacetate, 1,2,3-propanetriol triacetate, methyl formate or methyl acetate. Most preferably the ester is methyl acetate, 1,2-ethanediol diacetate or 1,2,3-propanetriol triacetate. Preferably the substrate is water soluble. For example methyl acetate is very water soluble.

The enzyme substrate and, optionally, the enzyme are initially provided in an aqueous solution with the polymer to be crosslinked and the crosslinking agent. Generally that solution has a pH from 5 to 11, preferably from 8 to 10, for example 9 to 10 and most preferably about 10.

The enzyme is dissolved in the aqueous solution generally at a concentration of from 0.00001 to 0.1% w/v (0.001 to 10% v/v for a 1% w/v solution), preferably 0.00001 to 0.01% w/v (0.001 to 1% v/v for a 1% w/v solution), and most preferably about 0.0005% w/v (0.05% v/v for a 1% w/v solution). The substrate is dissolved in the aqueous solution generally at concentration of from 0.01 to 20% v/v, preferably from 0.1 to 10% v/v. The concentrations are determined by the rate at which it is desired to break the gel and the conditions under which the gel is to be broken. The enzyme and substrate are generally provided in amounts sufficient to ensure an amount of acid is able to be released which is effective to cause breakdown of the gel.

The period of time which is allowed for the enzyme to catalyse the conversion of the substrate into the acid to cause the breakdown of the gel can vary as desired. It may be from 1 hour to 10 days, for example up to 1, 2 or 5 days. It may be for from 2 to 24 hours, for example at least 6 hours.

The method of the invention can be used to provide a temporary plug of a crosslinked water-based gel in an underground rock formation or a pipeline. It is particularly applicable, however, to hydraulic fracturing of underground reservoirs. The present method is especially advantageous for this purpose compared with the use of conventional gel-breaking enzymes in carbonate reservoirs because the acid that is released to break the gel simultaneously can clean up fracture faces by dissolving calcium carbonate rock.

In order to achieve hydraulic fracturing of an underground reservoir, therefore, a crosslinked water-based gel containing an enzyme substrate, a proppant such as sand or bauxite and, optionally, an enzyme can be provided under pressure in an underground reservoir to fracture thereby the reservoir; if the gel does not contain the enzyme, the enzyme is introduced into the reservoir to contact the gel; pressure is maintained whilst the enzyme is allowed to catalyse the conversion of the substrate into the acid to cause thereby the breakdown of the gel; and the pressure is released. The proppant remains in the fractures that have been formed to prevent them from closing down.

This method may be used to stimulate recovery from reservoirs found in all types of rock formation. Whilst the reservoir may be found in a carbonate rock formation or a rock formation in which carbonate rock cements together other types of rock, the invention may be particularly applicable to fracturing a reservoir in a sandstone formation. Water or a hydrocarbon, for example oil or gas, can then be recovered from the fractured reservoir. The gas may be, for example, methane, ethane or butane.

A well bore is drilled into the reservoir. The well bore serves as a convenient means for introducing the crosslinked water-based gel into the reservoir. An aqueous fracturing liquid comprising the polymer to be crosslinked, a crosslinking agent, the enzyme substrate, a proppant and, optionally, the enzyme can be injected into the reservoir. The crosslinked gel then forms within the well bore and/or reservoir. Hydraulic fracturing of the rock within the reservoir commences when pressure is applied to the gel from the surface.

Once a suitable oil or gas field which is to be subjected to hydraulic fracturing has been identified, it is necessary to select an enzyme which remains active under reservoir conditions. The following parameters are generally taken into consideration:

1) Temperature tolerance: The temperature of a reservoir is a function of its depth and can be in excess of 100° C. Many onshore reservoirs and some offshore reservoirs in formations are fairly shallow with temperatures falling within the 30°–60° C. range. Generally the enzymes used in the method of the present invention are active between 3° C. and 110° C., for example between 10° C. and 95° C. but an enzyme which is active at higher or lower temperatures may also be used. The enzymes used in the process of the invention have a range of temperatures over which they are active. When there is a temperature gradient in the oil/gas well, it may be desirable to use two or more enzymes together to ensure acid production occurs over the temperature range within the well.

2) Pressure tolerance: Pressure is also a function of depth. Pressures in offshore reservoirs in, for example, the North Sea may exceed 500 atmospheres, whereas shallower onshore fields are likely to be in the range 50–150 atm. If enzymes are to be injected at rates above fracture pressure, they must withstand injection pressures which will exceed reservoir pressure.

3) Salt tolerance: The ability to withstand high salt levels is important as reservoir brines can often be near saturated solutions. Enzymes may be injected in fresh water, but they will need to withstand the effects of salts diffusing into that fresh water.

4) Oil tolerance: Enzymes must be tolerant of oil although they may remain in the aqueous phase within the reservoir.

5) pH tolerance: Since gels are normally crosslinked under basic conditions, enzymes should tolerate pH values as high as 10 or 11.

The fracturing liquid which is injected into the reservoir may further contain chemical additives, for example at least one surfactant such as Nowsco's SS-100 (Trademark) as suspending agent for fine rock particles released during the treatment and oil-soluble surfactants to prevent sludge formation and chelating agents such as EDTA agents for iron control.

Since the pH of the injected liquid is typically basic as described above, there is little corrosion of, or reaction with surface injection equipment, down hole pumps or tubulars. Sequestering agents, which prevent iron precipitation and corrosion inhibitors are therefore not required in the method of the invention or are used in much smaller quantities than in conventional acidising techniques. Since the amount of acid produced by the action of the enzyme on the substrate increases slowly, there is a short period of time after enzyme is added to substrate when the solution has a very low concentration of acid. Acetic acid does not corrode steel, chrome or aluminium equipment.

The fracturing liquid may be injected either above or at the reservoir fracture pressure. The pressure may be varied during injection. If the fracturing liquid does not contain the enzyme required to catalyse the conversion of the enzyme substrate to the acid necessary to break the gel, the enzyme is injected into the reservoir too under pressure. Pressure may be applied whilst the proppant is pumped along the fractures that are Themed. The pressure is generally applied too whilst the enzyme catalyses the conversion of the substrate into the acid and the gel is thus broken down.

A well may be shut in for a period of 1 hour to 10 days, preferably 0.5 to 1 day, once the fracture is in place. The well may be shut in if it is desired to complete gel breaking or to clean up fracture faces in carbonate reservoirs.

The enzyme is typically dissolved in water generally at a concentration of from 0.00001 to 1% w/v (0.001 to 10% v/v for a 1% w/v solution), preferably 0.0001 to 0.01% w/v (0.1 to 0.1% v/v for a 1% w/v solution) and most preferably about 0.0005% w/v (0.05% v/v for a 1% w/v solution). The substrate can be dissolved in water generally at a concentration of from 0.01 to 20% v/v, preferably from 0.1 to 10% v/v. The concentrations are determined by the parameters of the reservoir such as injection rate, pressure and temperature. Depending on the reservoir conditions, enzyme or substrate concentrations may be used which are outside the ranges stated above.

Reaction rate is dependent on enzyme concentration. In hydraulic fracturing it is desirable to complete gel breaking within a few hours before the fracture pressure is removed. However it may be desirable to retain a temporary plug in a pipeline for several days before it is removed. To achieve this slow rate of gel breaking, enzyme concentrations should preferably be from 0.00001 to 0.1% w/v (0.001 to 10% v/v for a 1% w/v solution). Treatment times in hydraulic fracturing are minimised by using enzyme concentrations of from 0.00001 to 0.005% (w/v) (0.01 to 0.5% v/v for a 1% w/v solution).

The acid produced by the action of the enzyme on the substrate is allowed to react with the crosslinked gel and, in the case of a carbonate reservoir, carbonate rock, until the acidisation is substantially complete. Completion of acidisation generally takes 3 hours to 10 days depending upon the requirements of the treatment.

A by-product of the conversion of an ester into a carboxylic acid is an alcohol. For example, when methyl acetate is converted into acetic acid, methanol is produced. When the substrate is 1,2,3-propanetriol triacetate, glycerol is produced. The presence of alcohol is advantageous because it lowers the surface tension between oil and water in the well, thus accelerating well clean-up.

The present invention has the following particular advantages over the prior art:

1) Enzymes and substrate can be pumped into the fracture prior to completing or commencing, for example prior to completing 10%, of acid production. They can therefore breakdown crosslinked gels gradually so that the gel has time to perform its function prior to being broken down.

2) Hydrochloric acid injected from the surface would break the gel immediately.

3) Conventional gel breaking enzymes degrade the polysaccharide polymers and do not produce acid so that they cannot clean the fracture faces by dissolving carbonate fines during the treatment.

4) Conventional gel breaking enzymes are limited to temperatures below 50° C., the process of this invention is effective at temperatures up to 110° C.

5) The present invention uses enzymes to break crosslinked gels by a different mechanism to conventional enzyme breakers. The enzyme is used to change the pH through hydrolysis of an acid-yielding substrate, rather than degrading the polysaccharide.

The invention is illustrated by the following Example.

EXAMPLE 1

Comparison of Performance of Lipase Enzyme and Hemicellulase Enzyme at Breaking Borate Crosslinked Guar Gum Guar gum solutions (45 ml) were prepared by dissolving 0.5% w/v guar in distilled water or in 5% v/v 1,2,3-propanetriol triacetate (for samples to which lipase enzyme was to be added). The pH was lowered to 4 using acetic acid to hydrolyse fully the guar before the pH was adjusted back to 10 using sodium carbonate. The gum solutions were then crosslinked with 1 ml of sodium tetraborate (borax) at a concentration of 4% w/v to form gels. The gels were allowed to form before the enzymes (lipase extracted from Asperaillus sp. or hemicellulase, BREAKER L, Nowsco) were added at concentrations in the range 0.05%–1.0% v/v (1% w/v solution). Acetic acid (4 ml of 10M) was added to two gel samples; this gave a final concentration of acid close to that which should result from completion of the lipase conversion (800 mM). In all cases the gel solutions were made up to 50 ml using distilled water before viscosities were measured (Brookfield viscometer). The gels were then incubated at 40° C. for 24 hours and viscosities were read at 4.5 and 24 hours. The results are shown in Table 1.

TABLE 1

Viscosity and Shear rate of the Gels with Time

| Concentration | Viscosity (cP) and Shear Rate (per sec) with Time | | | | | |
|---|---|---|---|---|---|---|
| | 0 hours | | 4.5 hours | | 24 hours | |
| w/v lipase: | Viscosity | Shear rate | Viscosity | Shear rate | Viscosity | Shear rate |
| 0.0005% w/v | 54000 | 7.34 | 114 | 36.71 | 17 | 36.71 |
| 0.001% w/v | | | 115 | 36.71 | 16 | 36.71 |
| 0.0025% w/v | | | 105 | 36.71 | 28 | 36.71 |
| 0.005% w/v | | | 110 | 36.71 | 34 | 36.71 |
| 0.01% w/v | | | 104 | 36.71 | 39 | 36.71 |
| Acetic acid (800 mM) | 40500 | 14.68 | 147 | 36.71 | 83 | 36.71 |
| | | | 159 | 36.71 | 87 | 36.71 |
| hemicellulase: | | | | | | |
| 0.05% v/v | 40500 | 14.68 | 380 | 14.68 | 12 | 36.71 |
| 0.1% v/v | | | 15400 | 7.34 | 36 | 36.71 |
| 0.25% v/v | | | 2700 | 7.34 | 155 | 36.71 |
| 0.5% v/v | | | 6200 | 7.34 | 200 | 36.71 |
| 1.0 v/v | | | 520 | 14.68 | 5 | 73.45 |

The initial viscosities of the gels were very high (>40,000 cP). These viscosities were lost with time when the gels were incubated with enzymes or acid. Gels incubated with lipase and 1,2,3-propanetriol triacetate or with acetic acid were effectively broken after 4.5 hours while gels incubated with hemicellulase required between 4.5 and 24 hours to break down.

We claim:

1. A method of breaking a crosslinked water-based gel, which method comprises:
   (i) providing a said gel and, present therewith, an enzyme and a substrate which is capable of being converted by the enzyme into an organic acid which breaks down the gel, and
   (ii) allowing the enzyme to catalyze the conversion of the substrate into the acid to cause thereby the breakdown of the gel.

2. A method according to claim 1, comprising providing the said gel as a plug in an underground rock formation or a pipeline.

3. A method according to claim 1, comprising providing the said gel containing the enzyme substrate, a proppant and, optionally, the enzyme under pressure in an underground reservoir to fracture thereby the reservoir; if the gel does not contain the enzyme, introducing the enzyme into the reservoir to contact the gel; maintaining pressure while the enzyme is allowed to catalyze the conversion of the substrate into the acid to cause thereby the breakdown of the gel; and releasing the pressure.

4. A method according to claim 1, wherein the gel is a crosslinked polysaccharide or polyacrylamide gel.

5. A method according to claim 4, wherein the gel is a crosslinked gel of a polysaccharide selected from the group consisting of a galactomannan gum, a modified galactomman gum, a glucomannan gum, a xanthan gum and a cellulose derivative.

6. A method according to claim 5, wherein the gel is a crosslinked gel of a polysaccharide selected from the group consisting of guar gum, locust bean gum, a carboxyalkyl guar, a hydroxyalkyl guar, a carboxyalkyl hydroxyalkyl guar, glucomannan gum, xanthan gum, sodium carboxymethylcellulose, sodium carboxymethyl hydroxyethyl cellulose and hydroxyethyl cellulose.

7. A method according to claim 1 wherein the enzyme is selected from the group consisting of lipases and esterases.

8. A method according to claim 1 wherein the crosslinked water-based gel is formed by providing in an aqueous liquid:
   (a) a polymer capable of being crosslinked to form a gel,
   (b) a crosslinking agent,
   (c) the enzyme substrate, and
   (d) optionally, the enzyme.

9. A method according to claim 1 wherein the substrate is a carboxylic acid ester.

10. A method according to claim 9 wherein the substrate is an ester of an aliphatic carboxylic acid of formula $RCO_2H$ wherein R is selected from the group consisting of hydrogen, an alkyl group having from 1 to 6 carbon atoms and —$R'CO_2H$ wherein R' is selected from the group consisting of a bond and an alkylene group having 1 to 6 carbon atoms and wherein R and R' optionally have at least one halogen or hydroxyl substituent.

11. A method according to claim 10 wherein the substrate is selected from the group consisting of methyl acetate, ethyl acetate, methyl formate, 1,2-ethanediol diacetate and 1,2,3-propanetriol triacetate.

12. A method according to claim 1 wherein the enzyme is provided in an encapsulated form from which the enzyme is released over a period of time.

* * * * *